United States Patent [19]

Princevalle

[11] 4,250,635
[45] Feb. 17, 1981

[54] SAILING AID

[76] Inventor: Robert Princevalle, 28 Laurel Hill Dr., Niantic, Conn. 06357

[21] Appl. No.: 56,573

[22] Filed: Jul. 11, 1979

[51] Int. Cl.³ .............................................. G09B 9/06
[52] U.S. Cl. .................................................. 434/60
[58] Field of Search ........................ 35/11 A, 12 F, 74

[56] References Cited

U.S. PATENT DOCUMENTS

| | | | |
|---|---|---|---|
| 2,395,838 | 3/1946 | Beishline | 35/12 F |
| 2,470,143 | 5/1949 | Christie | 35/12 F |
| 2,516,677 | 7/1950 | Christie | 35/12 F |
| 3,305,943 | 2/1967 | Hansen | 35/11 A |
| 3,354,558 | 11/1967 | Peterson et al. | 35/74 X |
| 3,570,140 | 3/1971 | Sprong | 35/11 A |
| 3,680,230 | 8/1972 | Thompson | 35/74 |
| 3,747,230 | 7/1973 | Duval | 35/11 A |
| 3,783,530 | 1/1974 | Duval | 35/11 A |
| 3,940,862 | 3/1976 | Nishimura | 35/11 A |
| 4,202,114 | 5/1980 | Berson | 35/11 A |

Primary Examiner—William H. Grieb
Attorney, Agent, or Firm—Sughrue, Rothwell, Mion, Zinn and Macpeak

[57] ABSTRACT

A disk has imprinted around its outer periphery various sailboat trim conditions, from beat to run. In the central portion of the disk is an index in the shape of a boat hull. Between this index and the outer periphery of the disk in a rotatable annular index with arrows for indicating the wind direction. By maintaining the central index in alignment with the longitudinal axis of the sailboat hull and rotating the annular index so that it is aligned with the wind direction, one obtains from the outer periphery of the disk a reading which indicates the proper trim of the sailboat for that wind direction.

7 Claims, 3 Drawing Figures

U.S. Patent  Feb. 17, 1981  4,250,635

SAILING AID

BACKGROUND OF THE INVENTION

1. Field of the Invention

This invention relates generally to the field of navigational teaching devices and, more particularly, to such a device which is useful either in the classroom or on a sailboat for indicating to the user the proper sail trim for various wind directions for a particular heading of the boat.

2. Description of the Prior Art

Various sailing simulators or teaching devices are known in the prior art as reflected, for example, by the following U.S. Pat. Nos. 3,305,943; 3,570,140; 3,747,230; 3,783,530; and 3,940,862. Furthermore, other navigational teaching devices of the disk-type are shown in the following U.S. Pat. Nos. 2,395,838; 2,470,143; 2,516,677; and 3,680,230.

SUMMARY OF THE INVENTION

The primary object of the invention is to provide a sailing aid which is particularly useful for teaching the novice sailor the proper sail trim for various wind directions.

Another object of the invention is to provide such a sailing aid which is inexpensive and which is small enough to be held in the hand of the user.

A more specific object of the invention is to provide a sailing aid consisting of a disk having inscribed at predetermined positions along its outer periphery symbols indicating various sail trim positions. In the central portion of the disk is a central index representing the heading of the sailboat. Between this index and the outer periphery of the disk is a rotatable annular index consisting of arrows indicating the wind direction. To determine the proper sail trim for a given wind direction, the user aligns the central index with the heading of the boat and rotates the annular index until the arrows are aligned with the wind direction; the annular index then points to the correct sail trim for the given wind direction.

DETAILED DESCRIPTION OF THE PREFERRED EMBODIMENT

Figure 1:
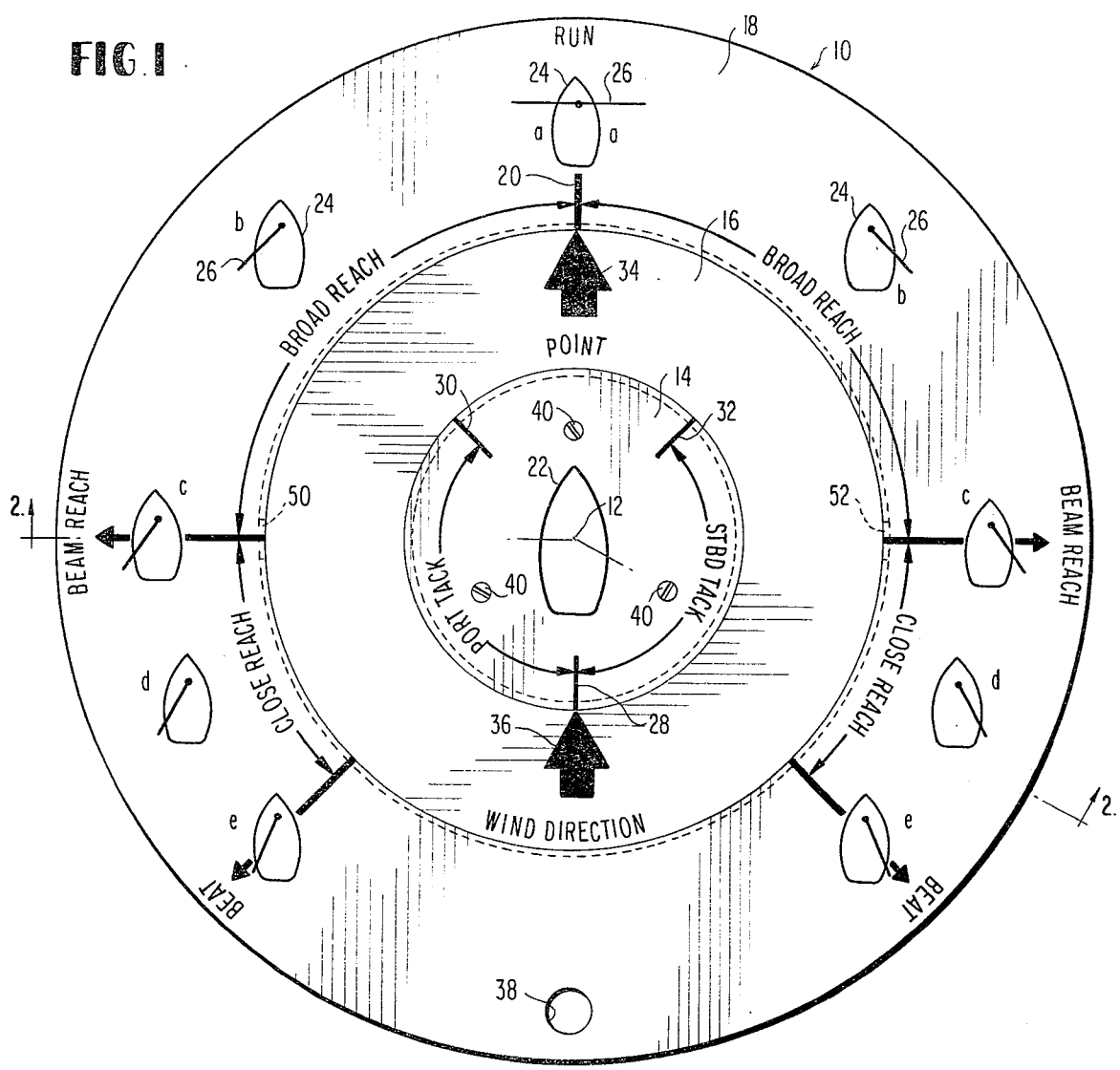
FIG. 1 is a plan view of the preferred embodiment of the invention.

With reference to the drawing and, at first, with particular reference to FIG. 1, the preferred embodiment of the invention is seen to consist of a large diameter disk 10 having a center 12. A small diameter disk 14, also having the center 12, is fixed to the large diameter disk 10. A ring or annulus 16, also having the center 12, is disposed between the disks 10 and 14 and is rotatable about the center 12 relative to the two disks.

Inscribed on the outer periphery 18 of the disk 10 is an elongated reference mark 20 which is aligned with the centerline of the boat hull outline 22 inscribed in the center of the disk 14. Inscribed on the outer periphery 18 of the disk 10 at each of a plurality of positions a, b, c, d and e is another boat hull outline 24 and a line 26 representing the angle or position of the sail relative to the centerline or heading of the boat.

In this preferred embodiment, positions a are in alignment with the reference mark 20 and are appropriately labelled, "RUN".

Positions b are angularly displaced in opposite directions from position a by 45° and are appropriately labelled, "BROAD REACH". Positions c are angularly displaced in opposite directions from position a by 90° and are appropriately labelled, "BEAM REACH". Positions d are angularly displaced in opposite directions from positions c by 22½° and are appropriately labelled, "CLOSE REACH". Positions e are angularly displaced in opposite directions from positions d by 22½° and are appropriately labelled, "BEAT".

At positions a, the positions of sail 26 are illustrated as being perpendicular to the headings or longitudinal axis of the boat hull but on opposite sides thereof. In positions b, the angle between the sail and boat heading is 45°, but on opposite sides of the centerline of the boat hull. In positions c, the sail angle is 35°, in positions d 30°, and in positions e 25°. Of course, additional trim positions between position a and positions e could be inscribed on the outer periphery 18 of disk 10, but those illustrated are deemed sufficient for the purpose of the invention, as the user can easily interpolate to determine the sail angle for the positions between those shown.

Also inscribed on the central disk 14 is another reference mark 28 in alignment with the center 12 and reference mark 20. The angle of displacement between the reference mark 28 and another reference mark 30 represents the sail trim condition conventionally termed as a port tack, and this angle of displacement is typically 135°. Similarly, the angle of displacement between the reference mark 28 and the reference mark 32 represents a sail trim which is conventionally termed a starboard tack and is also typically 135°.

The rotatable ring or annulus 16 has inscribed thereon diametrically opposite arrows 34 and 36 which point in the same direction and are labelled, "POINT", and "WIND DIRECTION", respectively.

When using this sailing aid in a classroom, the user merely points the bow of the hull outline 22 in the direction of a simulated boat heading, rotates the ring 16 until the arrows 34 and 36 point in the same direction as the simulated wind direction, and then merely reads the correct sail position a, b, c, d or e which is opposite the arrowhead 34 (interpolating or approximating the sail position when the arrowhead 34 is between any of the illustrated positions).

In actual use on a sailboat, the same procedure is followed, but the simulated boat heading and wind direction now become an actual boat heading and wind direction. A hole 38 is formed in the disk 10 at a position 180° from the reference mark 20 so that the sailing aid can be hung by a string around the user's neck.

The sailing aid may be made of stiff paper, cardboard, or plastic, and the particular material is not critical.

Figure 2:
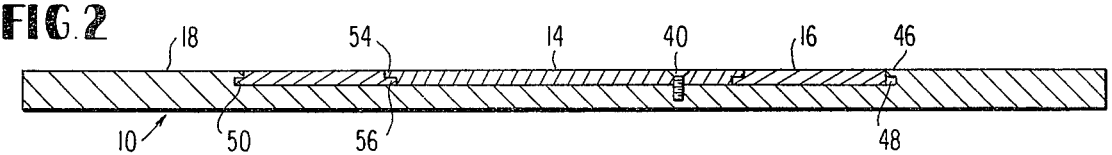
FIG. 2 is a cross-sectional view taken along line 2—2 of FIG. 1.
Figure 3:
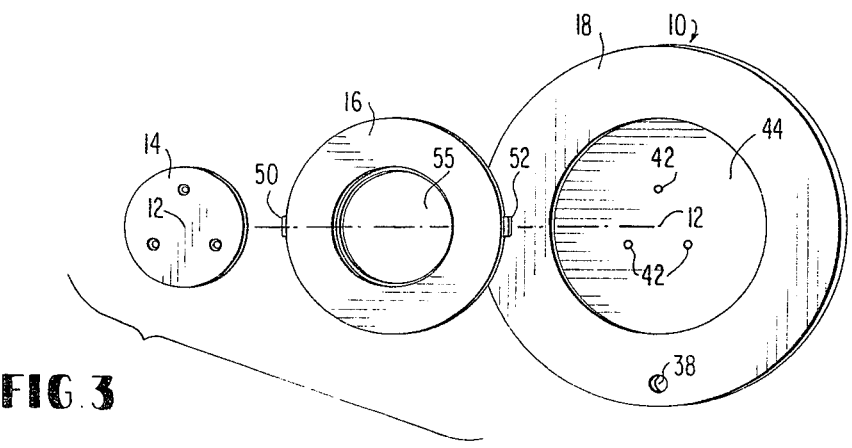
FIG. 3 is an exploded view of the device illustrated in FIGS. 1 and 2.

FIGS. 2 and 3 show in more detail the actual mechanical construction of the preferred embodiment of the invention. The central disk 14 is fixed to the large diameter disk 10 by three machine screws 40 which thread into three corresponding holes 42 formed in the disk 10. The outer periphery 18 of disk 10 has a thickness greater than that of the central portion of the disk, thereby forming a central recess 44 having a diameter approximately equal to the outer diameter of the ring 16. The outer periphery 18 of disk 10 has an inwardly extending flange 46 which forms a slot 48 for receiving a pair of outwardly extending tabs 50 and 52 on the ring 16. These tabs lock the ring 16 against lateral and vertical movement while permitting the ring 16 to rotate within the recess 44 about the center 12.

The central disk 14 also has an outwardly extending upper flange 54 which overlies an inwardly extending lower flange 56 on the ring 16 which is thus securely maintained in position between the disks 10 and 14 while being free to rotate relative thereto about the center 12.

To assemble the sailing aid, one inserts the ring 16 into the recess 44 of disk 10 so that the ring tabs 50 and 52 are engaged in the slot 48 of the disk 10, places the disk 14 into the central opening 55 of the ring 16 so that the flange 54 of the disk 14 rests on the flange 56 of the ring, and then secures the two disks and ring together by threading the machine screws 40 into the threaded holes 42 in the disk 10. As illustrated in FIG. 2, this construction of the preferred embodiment produces a sailing aid which has a flat surface.

Of course, obvious variations from this preferred embodiment will become apparent to those skilled in the art to produce the sailing aid whose basic function and structure is best illustrated in FIG. 1. Such variations are considered to be within the scope of this invention. As an example, the indicia inscribed on the disk 14 in the preferred embodiment may merely be inscribed on a corresponding central circular portion of a flat disk corresponding to disk 10, and the ring 16 may be replaced by a corresponding solid disk which is fixed by a shaft or other suitable means to the first disk at the center 12 to permit relative rotation of the two disks. In such a case, the second disk central portion, corresponding to the opening 55 in ring 16, would be made of suitable transparent material to permit the user to view the inscriptions on the underlying central portion of the first disk.

In other words, the basic elements of the invention are a disk (corresponding to disk 10 of the preferred embodiment) having imprinted about its outer periphery (18 of the preferred embodiment) various trim conditions (at positions a, b, c, d, and e of the preferred embodiment) for the sailboat, the conditions encompassing the range from RUN to BEAT. In the central portion of the disk is an index (the hull outline 22 in the preferred embodiment) representing the heading of the boat. Between this central index and the outer periphery of the disk is a rotatable index (arrowhead 36 in the preferred embodiment) representing wind direction. To operate the sailing aid, the user merely points the central index in the direction of the hull heading, and then rotates the annular index until it is aligned with the wind direction. The user then can read from the first disk the correct sail trim for the set wind direction.

Thus, the foregoing preferred embodiment, variation and basic construction of the sailing aid are all part of the invention whose scope is defined only by the following claims.

I claim:

1. A sailing aid for determining the correct trim of a sailboat for various wind directions relative to the heading of the sailboat, and comprising:

a first disk having an outer periphery containing a plurality of angularly displaced symbols representing various sail trims from RUN to BEAT, and having a central portion containing first index means representing the heading of the sailboat;

second index means representing wind direction; and mechanical means for mounting said second index means for rotation about an axis passing through the center of said first disk, whereby, when said first index means is set to be aligned with the heading of the sailboat and said second index means is set by rotation to be aligned with the wind direction, said second index means indicates on said outer periphery of said first disk the correct trim condition for the set heading and wind direction.

2. A sailing aid as defined in claim 1 wherein said second index means comprises a second disk of smaller diameter than said first disk, said outer periphery of said first disk being defined as the radial distance between the diameters of said first and second disks.

3. A sailing aid as defined in claim 2 wherein said second disk containing a window overlying said central portion of said first disk.

4. A sailing aid as defined in claim 3 wherein said window comprises a circular opening in the center of said second disk.

5. A sailing aid as defined in claim 4 wherein:

said central portion of said first disk comprises a third disk of substantially the same diameter as said opening in said second disk and having an outwardly radially extending upper flange;

said first disk has a circular central recess of substantially the same diameter as the diameter of said second disk and has a circular upper flange extending radially inwardly into said circular recess; and said second disk comprises radially outwardly and inwardly extending flange portions positioned beneath the upper flanges of said first and second disks, respectively.

6. A sailing aid as defined in claim 5 further comprising means for securing said third disk to said first disk with said second disk therebetween so that said second disk is free to rotate relative to said first and third disks.

7. A sailing aid as defined in claim 5 wherein said first disk contains a hole for receiving a string to permit the sailing aid to be hung around a person's neck.

* * * * *